United States Patent [19]

Jones et al.

[11] Patent Number: 4,840,450
[45] Date of Patent: Jun. 20, 1989

[54] APPARATUS AND METHOD FOR OPTICAL FIBER END POSITIONING FOR LASER INJECTION

[75] Inventors: Marshall G. Jones; Angel L. Ortiz, Jr., both of Scotia; Tushar S. Chande; John L. August, Jr., both of Schenectady, all of N.Y.

[73] Assignee: General Electric Company, Schenectady, N.Y.

[21] Appl. No.: 151,844

[22] Filed: Feb. 3, 1988

[51] Int. Cl.[4] .............................................. G02B 6/36
[52] U.S. Cl. ................................ 350/96.20; 350/96.18; 350/96.21; 350/320
[58] Field of Search ............... 350/96.10, 96.15, 96.17, 350/96.18, 96.20, 96.21, 96.22, 320; 250/227

[56] References Cited

U.S. PATENT DOCUMENTS

| | | | |
|---|---|---|---|
| 4,147,405 | 4/1979 | Spainhour | 350/96.21 |
| 4,192,056 | 3/1980 | Logan et al. | 350/96.21 |
| 4,273,412 | 6/1981 | Hillegonds | 350/96.20 |
| 4,274,707 | 6/1981 | Pacey et al. | 350/96.20 |
| 4,379,771 | 4/1983 | Snyder | 350/96.20 |
| 4,447,119 | 5/1984 | Beasley | 350/96.18 |
| 4,475,788 | 10/1984 | Tomassini et al. | 350/96.20 |
| 4,491,294 | 1/1985 | Blume et al. | 350/96.20 X |
| 4,500,165 | 2/1985 | Scholl et al. | 350/96.20 |
| 4,542,956 | 9/1985 | McCrickerd | 350/96.20 |
| 4,548,466 | 10/1985 | Evans et al. | 350/96.20 |
| 4,562,632 | 1/1986 | Parchet et al. | 350/96.21 X |
| 4,564,736 | 1/1986 | Jones et al. | 219/121 L |
| 4,615,097 | 10/1986 | Genequand | 350/96.20 X |
| 4,676,586 | 6/1987 | Jones et al. | 350/96.20 |
| 4,678,271 | 7/1987 | Beaulieu | 350/96.20 |
| 4,681,396 | 7/1987 | Jones | 350/96.18 |
| 4,721,357 | 1/1988 | Kovalchick et al. | 350/96.20 |
| 4,736,632 | 4/1988 | Case | 350/96.20 X |
| 4,746,195 | 5/1988 | Auracher et al. | 350/96.20 X |
| 4,747,657 | 5/1988 | Chaoui et al. | 350/96.20 X |
| 4,767,174 | 8/1988 | Carenco et al. | 350/96.20 |
| 4,775,211 | 10/1988 | Wondrazek et al. | 350/96.20 |

Primary Examiner—William L. Sikes
Assistant Examiner—Brian M. Healy
Attorney, Agent, or Firm—Paul R. Webb, II; James C. Davis, Jr.

[57] ABSTRACT

Mechanical apparatus and method for positioning an optical fiber for injection with a laser beam is disclosed. The apparatus comprises a mechanical seat which is positioned to abut a first optical fiber which has been aligned by an optical alignment technique. Upon the need to replace the first fiber, the apparatus enables positioning of the mechanical seat at the same location so that a second fiber can be aligned in the same position as the first fiber without the need to employ an optical alignment technique.

18 Claims, 2 Drawing Sheets

FIG. 1

APPARATUS AND METHOD FOR OPTICAL FIBER END POSITIONING FOR LASER INJECTION

The present invention is directed in general to optics systems in which a laser beam is injected into the end of an optical fiber and, more specifically, to laser materials processing systems in which a power laser beam is injected into the fiber input end for transmission to a remote end of the fiber where materials processing is performed with the emitted beam.

BACKGROUND OF THE INVENTION

Laser materials processing as known in the art and used herein refers to performance of materials processes such as cutting, welding, drilling and soldering, using a continuous wave or pulsed laser beam. The average power of such a laser beam may range from as little as approximately one watt to 100's of watts, the specific power being selected on the basis of the particular processing being performed. It is also known in the art to transmit the laser beam from the laser to the vicinity of the workpiece by means of an optical fiber. Apparatus and method for injecting a power laser beam into an optical fiber for transmission therethrough are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System", the disclosures of those patents being incorporated in their entirety herein by reference.

As disclosed in the above incorporated patents, injection of the laser beam into the fiber end is accomplished by focusing the beam, by means of one or more lenses, onto the prepared input end of the fiber. Specific requirements for the size of the focused beam cone, the beam spot size as focused on the fiber end, and the fiber end preparation are described in those patents. Compliance with these requirements is necessary in order to successfully inject the laser beam into the optical fiber for transmission therethrough. Implicit in these requirements is the need to properly align the focused laser beam with the fiber end. Misalignment of the beam and fiber end will result in either inefficient or no beam transmission through the fiber. Further, where the laser beam has sufficient power, misalignment will result in damage to the fiber end thereby requiring replacement of the fiber or repair of the fiber end.

Various techniques are known in the art for aligning optical components, such as the alignment of a single core optical fiber with a focused laser beam. Such optical alignment techniques include the use of cameras, microscopes, low power aligning lasers, infrared viewing of a power laser operated at low, non-damaging power levels or some combination of these techniques. A common characteristic of these optical alignment techniques is that they are time consuming, require performance by a skilled optics technician and are based on a subjective assessment made by that technician. That is, the optics technician uses his/her skill to subjectively judge, based on observation using one of the listed alignment techniques, when the components are aligned.

The time consuming aspect of such optical alignment techniques and the need for their practice by a skilled optics technician present a problem in a manufacturing environment where laser materials processing is practiced. Upon the occurrence of each need to replace or reposition an optical fiber being injected with a laser beam, the time required to effect fiber alignment with the beam injecting apparatus represents manufacturing downtime and therefore manufacturing cost and inefficiency. This downtime is magnified by the time consuming aspects of the known optical alignment techniques as well as by being constrained by the availability of an optics technician to effect the alignment. While it is acknowledged that the known optical techniques provide accurate alignment, it would be desirable to provide a mechanical technique analogous to such optical techniques that enables positioning of a fiber to assume the precise alignment of a fiber initially installed and aligned using an optical technique. Such a mechanical technique would preferably be minimally subjective and not require practice solely by a skilled optics technician. As a result, an initial alignment using an optical alignment technique would only have to be performed once, the mechanical technique being employed for all subsequent alignments to duplicate the alignment achieved with the initial optical alignment.

One technique practiced in the art as an attempt to minimize movement of an installed fiber, and thereby hopefully promote a longer service life, is the rigid mounting of the fiber end in a coupler which in turn connects to the laser beam source. In such a case, the coupler may include the focusing apparatus which focuses the laser beam for injection. A further feature of such couplers is that the fiber is typically "potted" into the coupler, e.g. an epoxy material is flowed over a portion of the fiber and surrounding coupler environment to ensure no fiber movement once alignment is achieved. Where misalignment does occur, whether due to incorrect alignment of the fiber within the coupler, misalignment in the coupler's connection to the laser source, misalignment in the focusing lens arrangement, etc., damage to the fiber end will result where a power laser beam of sufficient energy is used or, at very least, inefficient beam transmission will result. In either event, fiber replacement will be required and because of the potting of the fiber within the coupler, the entire coupler in addition to the fiber will have to be discarded.

It is therefore a principal object of the present invention to provide apparatus and method for positioning an optical fiber for laser beam injection, in the precise location of a previously aligned fiber, which is not subject to the aforementioned problems and disadvantages.

SUMMARY OF THE INVENTION

In accordance with the present invention, there is provided apparatus and method for positioning an input end of an optical fiber at a predetermined location for injection with a laser beam. The fiber end predetermined location is uniquely defined relative to a laser beam axis and a reference surface. The fiber is mounted in fiber holding means for adjustably moving the fiber end in x, y and z mutually orthogonal coordinate directions to achieve the predetermined location. With the fiber so mounted, the laser beam axis and a longitudinal axis of a fiber end portion adjoining the fiber end are parallel to the z-direction. The inventive apparatus comprises a positioner for adjustably positioning an object affixed thereto in three mutually orthogonal directions. A mechanical seat is affixed to the positioner and includes a planar seating surface for seating the fiber end. A predetermined position on the seating surface is allocated for seating the fiber end when the end is positioned at the predetermined location. The apparatus further includes means for supporting the positioner in a unique predetermined relation to the reference surface and beam axis so that the three orthogonal adjusting directions thereof are parallel to the x-, y- and z-directions and the planar seating surface is perpendicular to the z-direction. The seating surface is further positioned to confront the fiber end positioned at the predetermined location. The positioner is further supported so that the seating surface can be adjusted in the x-, y- and z-directions until reaching first x, y and z positions effective to position the fiber input end to substantially abut the seating surface predetermined position. The positioner enables restoration of the first x, y and z positions following positioner readjustment along at least one of the x-, y- or z-directions to introduce sufficient clearance between the mechanical seat and the fiber end so that the positioner and mechanical seat can be removed.

In accordance with a preferred embodiment of the present invention, the mechanical seat is provided with the seating surface adjoining a first surface of the mechanical seat. A portion of the seating surface is bounded by a substantially planar ledge portion perpendicular to the seating surface and parallel to the z-direction, while the remainder of the seating surface extends to a periphery of the mechanical seat. The ledge portion extends between the seating surface and mechanical seat first surface and includes a groove, having a semicircular cross section, that extends from a base at the seating surface to the mechanical seat first surface. The groove has an axis parallel to the z-direction and a diameter exceeding by a small predetermined amount the diameter of the optical fiber to be positioned. The seating surface predetermined location is at the base of the groove, so that an optical fiber laying in the groove abutting the seating surface abuts the seating surface predetermined location.

With the apparatus of the present invention so provided and an initial installation of a first optical fiber with its fiber end positioned at the fiber end predetermined location, e.g. by use of an optical alignment technique, the positioner can be adjustably positioned to the first x, y and z positions with the first fiber end substantially abutting the seating surface predetermined position. Then, the positioner can be removed following readjustment in at least one of the x-, y- or z-directions. In order to subsequently determine if the first fiber end is still positioned at the predetermined location or to install a second fiber in place of the first fiber, the positioner is first reinstalled and adjusted so that the seating surface is positioned at the first x, y and z positions. Then the fiber to be positioned is moved until the end thereof substantially abuts the seating surface predetermined position. As a result, this second positioning operation is performed without the need for an optical alignment technique.

The method of the present invention commences with a step of mounting the planar seating surface of the mechanical seat to confront the end of a first optical fiber where that fiber end is positioned at the predetermined location, e.g. by an optical alignment technique. The seating surface includes the above described predetermined position allocated for seating the fiber end when positioned at the predetermined location. The seating surface is perpendicular to the z-direction. Next, the position of the mechanical seat is adjusted in the x-, y- and z-directions until reaching first x, y and z positions, which can either be fixed or restored, effective to position the first fiber end to substantially abut the seating surface predetermined position. Then, the mechanical seat position is readjusted in at least one of the x-, y- or z-directions by a distance sufficient to effect a clearance between the mechanical seat and the first fiber end to allow removal of the mechanical seat. The mechanical seat is then removed to enable injection of the laser beam into the first fiber end. Upon replacement of the first fiber with a second fiber and the second fiber being mounted in the fiber holding means, the second fiber end is positioned at the fiber predetermined location. This is accomplished by first remounting the mechanical seat to a position identical to that which it previously held relative to the x-, y- and z-directions including adjustment to restore the first x, y and z positions. Next, the second fiber is moved in the x-, y- and z-directions until the end thereof substantially abuts the seating surface predetermined position. Then, the mechanical seat position is adjusted to effect a clearance between the seat and the fiber end. As a final step, the mechanical seat is removed to enable injection of the laser beam into the second fiber end.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

The invention is directed to mechanical apparatus and method for positioning the end of an optical fiber for injection with a laser beam, so that the fiber end is positioned at the same location as a previous optical fiber which was correctly aligned and positioned, such as by an optical alignment technique, for beam injection.

Figure 1:
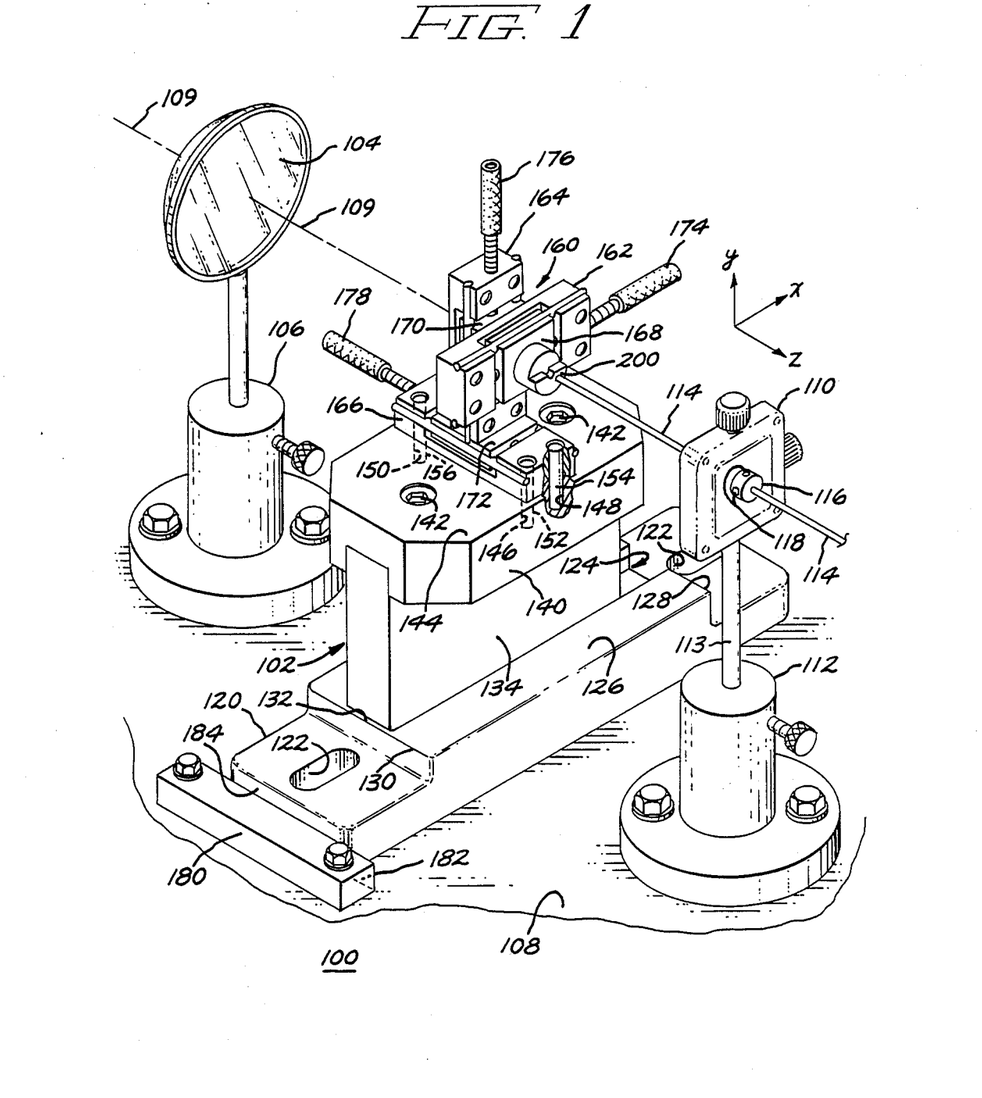
FIG. 1 illustrates an optical fiber injection system including apparatus constructed in accordance with the present invention for mechanically positioning a fiber end at a previously determined location.

Referring now to the drawings, FIG. 1 illustrates an exemplary optical fiber injection system 100 including apparatus 102 for the mechanical positioning of a fiber end at a previously determined location. System 100 includes a focusing lens 104 mounted on an adjustable support stand 106. Focusing lens 104 is represented as a single plano-convex lens, for focusing a laser beam for injection into the end of an optical fiber, but could comprise any lens type or combination of lenses known in the art for performing the focusing function. Support stand 106 is preferably provided with a coarse vertical adjustment capability only, though additional adjustment capabilities could be provided. Support stand 106 is fastened to a planar reference surface 108 which may be provided as an optical breadboard. A longitudinal axis 109 of the laser beam being focused is also illustrated in FIG. 1. The laser beam to be injected is initially aligned, prior to mounting the focusing lens, so that longitudinal axis 109 of the beam is parallel to the reference surface. A reference coordinate system consisting of x, y and z mutually orthogonal coordinate directions is defined herein, for convenience of explanation, relative to the beam axis and reference surface. The z-direction is parallel to the laser beam axis. The x- and y-directions are respectively parallel and perpendicular to the reference surface while being orthogonal to one another and the z-direction. These directions are illustrated in FIG. 1.

System 100 further includes an adjustable fiber holder 110 mounted on an adjustable support stand 112 and holding a fiber 114 for beam injection. Stand 112 is shown as being fastened to reference surface 108 and having a coarse vertical adjustment capability. Stand 112 is assumed to be mounted flush on the reference surface so that a support post 113 of the fiber holder is perpendicular to the reference surface. Fiber holder 110 is selected to have fine adjustment capability in three mutually orthogonal coordinate directions. With the fiber holder positioned to hold the end of fiber 114 for injection with the laser beam, a longitudinal axis of the fiber is coaxial with the laser beam axis. As a result, the fiber holder three adjustment directions are parallel to the above defined x, y and z mutually orthogonal directions defined relative to the reference surface and beam axis 109. The fiber holder is also preferably selected to have tilt adjustability to effect angular orientation of the holder about the x- and y-directions. Fiber holder 110 includes a central orifice for passing therethrough optical fiber 114. The fiber holder includes a collar 11 6, concentric with the orifice through which the fiber passes, having two set screws 118 which are tightened to hold the fiber in place. Fiber holder 110 may be provided as a model no. 07 HFO 002 fiber optic holder as manufactured by Melles Griot Corporation of Irvine, Calif. Mechanical positioning apparatus 102 comprises a metal base portion 120 which includes clearance holes 122 for receiving bolts (not shown) for affixing the positioning apparatus to the reference surface. Base 120 may be fabricated of strain relieved aluminum. The base includes a rectangular slot 124 of uniform width and depth machined into a top surface 126 thereof. The slot extends from an end 128 of surface 126 almost to an end 130 thereof so that a portion 132 of the surface remains. The slot is sized to receive a rectangular support member 134. A width dimension of the support member is smaller than the slot width by the minimal amount required to enable movement of the support member along the slot. As a result, with the support member installed in the slot and base 120 oriented so the length of slot 124 is parallel to the x-direction as shown in FIG. 1, there is substantially no freedom of movement of support 134 along the z-direction within the slot. The part of base 120 contiguous to surface portion 132 serves as a positive stop at the end of slot 124 to the movement of support 134 therealong. Thus, with base portion 120 tightly bolted to the reference surface, support 134 may be repeatedly removed and reinserted to a substantially identical position, relative to the x-, y- and z-directions, within the slot against the positive stop. Support 134 may be fabricated of strain relieved aluminum. Positioning apparatus 102 further includes a mount portion 140 which is bolted to support 134, by means of bolts 142, so that no relative movement between mount 140 and support 134 can occur. A planar mounting surface 144 of mount 140 is parallel to the reference surface and hence parallel to the x- and z-directions. This result is achieved by appropriate fabrication of base 120, slot 124, support 134 and mount 140. Mount 140 is preferably fabricated of strain relieved aluminum. The mount includes four cylindrical positioner mounting holes, three of which are visible in FIG. 1 as holes 146, 148 and 150, for receiving four positioner locating pins, the three pins visible in FIG. 1 being respectively designated locating pins 152, 154 and 156. The respective axes of the pins as installed are perpendicular to surface 144. The pins are preferably sized relative to the holes to provide a tight fit so that they are not easily removed. The depths of the holes and the pin lengths are selected so that the pins when inserted in the holes project above surface 144 by an amount sufficient to enable engagement with locating holes of a positioner 160 mounted on surface 144.

Positioner 160 comprises three micropositioning devices 162, 164 and 166 for respectively providing independent, finely adjustable positioning movement along three mutually orthogonal directions. Micropositioning devices 162, 164 and 166 respectively include moving stages 168, 170 and 172 and are affixed to one another, e.g. by screws, to provide positioning movement of their respective stages in three mutually orthogonal directions by rotation of adjustment rods 174, 176 and 178. Such an assembly of three micropositioning devices is available as model no. MM-1 XYZ manufactured by National Aperture, Inc. of Lantana, Fla. The four holes in mount 140 are spaced to align with four mounting holes in positioning device 166. The four positioner locating pins are sized to effect a slip fit with the mounting holes of positioning device 166. The slip fit is designed to be only loose enough to enable placement and removal of positioner 160 on the pins, i.e. along the y-direction, but not so loose as to enable any free movement along mounting surface 144. Since positioning device 166 is flush mounted onto mounting surface 144 and since that surface is parallel to the reference surface, and hence the x- and z-directions, the movement of stage 170 of positioning device 164 is parallel to the y-direction.

In accordance with the preferred practice of the present invention, however, it is necessary to orient the positioner mounting holes and/or base 120 on the reference surface relative to the x- and z-directions so that adjusting movements by positioning devices 162 and 166 are respectively parallel to the x- and z-directions. In the preferred practice of the present invention, this is accomplished by locating a guide bar 180 on reference surface 108 during the previously described alignment of the laser beam. Guide bar 180 has a planar surface 182 that is perpendicular to surface 108. As is known in the art, laser beam alignment is typically carried out by adjusting the laser beam attitude so that it passes through a plurality of aperture devices mounted on the reference surface. At that time, guide bar 180 is positioned and bolted in place relative to the apertures, so that surface 182 thereof is parallel to beam axis 109. The guide bar is further spaced from the beam axis along the x-direction by a predetermined distance, e.g. by use of a premachined spacer inserted between the aperture devices and the guide bar. An end face 184 of base 120 is machined smooth and perpendicular to the reference surface to abut guide bar surface 182. The positioner mounting holes in mounting surface 144 are oriented relative to end face 184 so that upon its abutment against guide bar surface 182, the adjustment directions of micropositioning devices 162 and 166 are parallel to the x- and z-directions, respectively. The predetermined x-direction spacing of the guide bar from the beam axis is selected so that a mechanical seat 200 affixed, e.g. by glue, to stage 168 of micropositioning device 162 substantially confronts the end of fiber 114.

Figure 2:
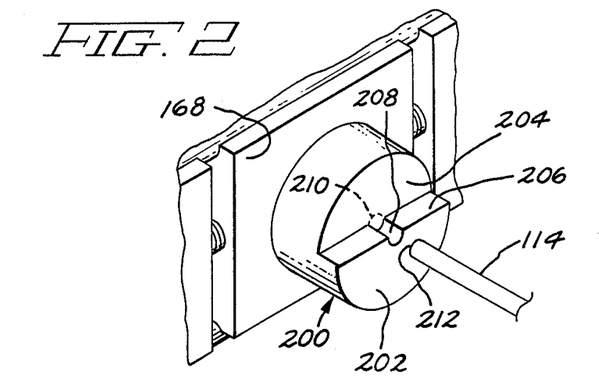
FIG. 2 illustrates a mechanical seat constructed in accordance with a preferred embodiment of the present invention.

An enlarged view of mechanical seat 200 as mounted on stage 168 is shown in FIG. 2. Seat 200 includes a first surface 202 which adjoins a planar seating surface 204. A portion of the seating surface is bounded by a substantially planar ledge 206 which is perpendicular to the seating surface. With positioner 160 oriented as described above, the seating surface is perpendicular to the z-direction and the surface of the ledge is parallel to both the x- and z-directions. The ledge portion includes a groove 208 having a semicircular cross section and extending from a base at seating surface 204 to first surface 202. An axis of the groove is parallel to the z-direction. The diameter of the groove is selected to slightly exceed the diameter of the optical fiber to be positioned, e.g. by 0.002 inches or less, so that the fiber substantially fits in the groove. It is noted that in practice, as disclosed in the above incorporated patents, the end of fiber 114 is prepared for laser beam injection by stripping the jacket and cladding away from the fiber core along a portion of the fiber terminating at the end being injected. This detail is not illustrated in the Figures. However, where the mechanical seat groove diameter is described relative to fiber diameter, it is the diameter of the fiber core that is the pertinent dimension. A circular portion 210 (partially shown by a broken line in FIG. 2) of the seating surface is allocated for seating a fiber end, during positioning, when the fiber end is at the aligned location for laser beam injection. With the fiber so aligned, the fiber substantially lies in the groove since the fiber end portion is coaxial with the beam axis which, in turn, defines the z-direction. As noted above, the groove axis is also parallel to the z-direction. In FIG. 2, an end 212 of fiber 114 is shown aligned with portion 210 but, for clarity, spaced therefrom along the z-direction. The mechanical seat is preferably fabricated from a material softer than the core of the optical fiber to be positioned. Selection of such a material assures no damage to the tip of the fiber during the positioning operation. In the preferred practice of the present invention, in which a high power laser beam is to be injected, a quartz optical fiber is preferred. For such a fiber, the mechanical seat can be fabricated from a Lucite TM or Nylon TM material or some other material that is softer than the quartz core.

As stated above, the spacing of guide bar 180 from the beam axis is selected so that mechanical seat 200 confronts end 212 of fiber 114. More particularly, the guide bar spacing is selected to position portion 210 of the seating surface within a range of adjustment, along the x-direction of micropositioning device 162 so that portion 210 can be aligned with the fiber end along the x-direction. The height of positioning apparatus 102 is selected relative to the contemplated height, in the y-direction, of the beam axis over the reference surface to assure that seating surface portion 210 is within a range of adjustment, along the y-direction, of micropositioning device 164, so that portion 210 can be aligned with the fiber end along the y-direction.

In operation, after an initial optical fiber, such as fiber 114, has been positioned with its end aligned for injection with the laser beam, e.g. by an optical alignment technique, mechanical positioning apparatus 102 is positioned on reference surface 108 with end face 184 abutting guide bar surface 182. In this initial position of positioning apparatus 102, though the fiber end confronts the mechanical seat, it is not yet in contact with any portion thereof. Either before or after the positioning of positioning apparatus 102, micropositioning device 166 is adjusted so that stage 172 thereof is moved to the end of its adjustment range closest to the fiber end. With the fiber end still clear of the mechanical seat, micropositioning device 164 is adjusted along the y-direction, if necessary in order to generally align seating surface 204, rather than first surface 202, with the fiber end. Next, positioning apparatus 102 is moved along the z-direction, using its abutment against guide bar 180 to guide the movement, until the fiber end abuts any portion of the seating surface. It is preferred herein, though not essential, that a piece of lens tissue be interposed between the fiber end and seating surface to provide further assurance that no damage to the fiber end results. At this point, with positioning apparatus 102 so positioned, base 120 thereof is rigidly bolted to reference surface 108. Next, micropositioning devices 162 and 164 are adjusted to respectively move the mechanical seat in the x- and y-directions, respectively, until the fiber end abuts portion 210 of the seating surface. At this point, the lens tissue can be removed. With the mechanical seat so oriented with respect to the fiber end, the fiber (i.e. the fiber core) lies in groove 208. It is noted that a technician performing the adjustment can readily identify the correct positioning of the fiber since movement upward in the y-direction or to either side in the x-direction will cause observable movement of the fiber.

Having so positioned the mechanical seat, the x- and y-direction adjustment capabilities of micropositioning devices 1 62 and 164, respectively, are fixed against further adjusting movement. This can be accomplished by providing a lock nut (not shown) on the threaded portion of each adjusting rod 174 and 17 6 so that the rod is locked against further movement by tightening the nut against the body of the micropositioning device. In the alternative, glue can be applied to the point where the adjusting rod enters the device body. Next, the position of the mechanical seat is adjusted along the z-direction away from the fiber end by a distance sufficient to effect a clearance between the seat and fiber end. Having provided such a clearance, positioner 160 is removed in order to provide a clear path enabling injection of the laser beam into the fiber end. Positioner 160 may be removed simply by lifting it from the positioner locating pins or by leaving the positioner in place on mounting surface 144 and instead removing support member 134 from slot 124. In any event, base 120 remains rigidly bolted to surface 108.

Upon the replacement of the first, initially aligned fiber with a second fiber, or upon the need to realign the initial fiber, alignment of the second fiber or realignment of the first fiber need not be performed using an optical alignment technique. Instead, the mechanical seat is remounted to the identical position it held when the end of fiber 114 abutted seating surface portion 210. This is accomplished by first remounting positioner 160 in a manner that depends on how it was removed. That is, if mount 140 is still in place, then positioner 160 is simply replaced on its locating pins. If support member 134 was removed, then it must be replaced as well. Micropositioning device 166 is readjusted to the end of its adjustment range nearest the fiber holder. The optical fiber to be positioned is mounted in the fiber holder and the holder is adjusted until the end of the fiber abuts seating surface portion 210 and the fiber lies in groove 208. At this point, the fiber is positioned for beam injection. The end of the second fiber is located at the same position as the end of the first fiber and the axis of the second fiber is parallel to the z-direction. It is noted Applicants have found in practice that with the end of the fiber correctly positioned, the fiber axis need not be precisely parallel to the z-direction in order for successful beam injection to occur. Next, micropositioning device 166 is again adjusted to introduce clearance between the mechanical seat and fiber end and the positioner is removed. As a result, the second fiber has been aligned by means of the mechanical apparatus and method of the present invention which does not require the time consuming practice of an optical alignment technique or the skill of an optics technician. Obviously, subsequent fibers can be aligned in the same manner.

Figure 3A:
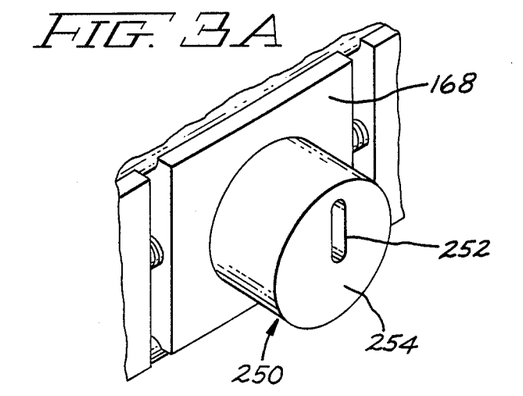
FIGS. 3A and 3B illustrate a mechanical seat constructed in accordance with another embodiment of the present invention.
Figure 3B:
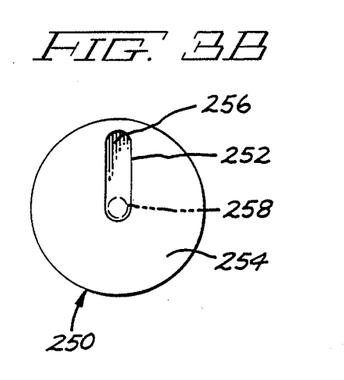

While FIG. 2 illustrates a preferred construction of mechanical seat 200, the invention may be successfully practiced with a mechanical seat 250 illustrated in FIGS. 3A and 3B. Seat 250 is provided with a slot 252, formed in a first surface 254 of the mechanical seat, having a uniform width selected to exceed the diameter of the fiber (i.e. the fiber core) by a small amount, such as 0.004 inches or less. The length of slot 252 is preferably oriented to be parallel to the y-direction. The walls of the slot extend to a seating surface 256 and are perpendicular thereto. Seating surface 25 6 is planar and perpendicular to the z-direction. As seen in FIG. 3B which presents a plan view of seat 250, a portion 258 of seating surface 256, at one end of the slot, is allocated for abutment with the end of the fiber being positioned when the fiber is properly aligned for injection with the laser beam. The end of slot 252 at which portion 258 is located serves the same function as groove 208 of mechanical seat 200, in that a fiber lying along the slot wall at that end of the slot is parallel to the z-direction. In practicing the method of the present invention with mechanical seat 250, it is preferred that following initial positioning of mechanical positioning apparatus 102, so that the mechanical seat confronts the end of an optically aligned fiber, micropositioning devices 162 and 164 are next adjusted, along the x- and y-directions, to align the fiber end with some portion of the slot. This alignment preferably results in the alignment of the fiber end with portion 258 of the seating surface. Then, with micropositioning device 166 already having been adjusted to the end of its travel nearest the fiber end, positioning apparatus 102 is moved along the z-direction, with guide bar 180 guiding the movement, until the fiber end abuts seating surface portion 258.

Figure 4A:
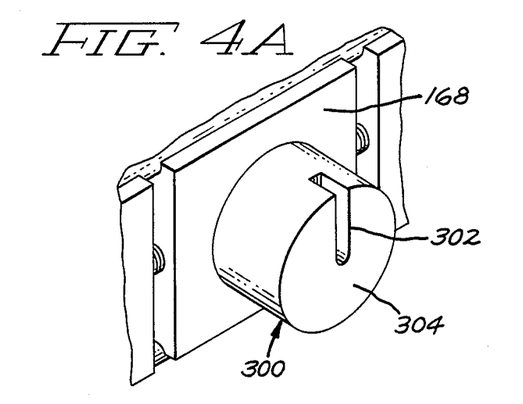
FIGS. 4A and 4B illustrate a mechanical seat constructed in accordance with a further embodiment of the present invention.
Figure 4B:
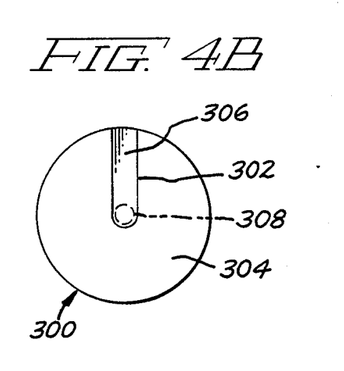

The invention may also be successfully practiced with a mechanical seat 300 illustrated in FIGS. 4A and 4B. A slot 302 of uniform width is formed in a first surface 304 of seat 300. Slot 302 extends to the periphery of the first surface. As in the case of seat 250, the width of slot 302 is selected to slightly exceed the fiber core width. As seen in FIG. 4B which is a plan view of seat 300, the walls of the slot extend to a planar seating surface 306 and are perpendicular thereto. A portion 308 of seating surface 306 is allocated, at the end of the slot, for abutment with the fiber end when properly aligned for beam injection. In operation, the practice of the present invention with mechanical seat 300 would be substantially the same as described for seat 250. Provision of slot 302 extending to the seat first surface periphery serves to provide greater latitude in initially aligning the fiber end with the slot.

In the illustrated embodiment of the present invention, micropositioning device 166 is adjusted to the end of its travel and micropositioning devices 162 and 164 are fixed in position. The invention is, however, not so limited. The micropositioning devices may be provided with vernier scales on their respective adjusting rods so that the adjustment position of each device can be uniquely numerically expressed. In such a case, micropositioning device 166 would be adjusted to a reference position, which is not necessarily the end of its travel, which has a unique numerical identity. Then, when a second fiber is positioned, device 166 can simply be readjusted to that reference position. Also, with the provision of such vernier scales, it is not necessary to fix in position the x- and y-direction micropositioning devices. Instead, their positions as represented by their respective vernier scales can be noted and when the second fiber is subsequently positioned, it would only be necessary to assure that each device is at the proper position as indicated on its vernier scale. Further, prior to removal of positioner 160, one or more of the three positioning devices can be adjusted to clear the fiber end, since all positions can be subsequently restored.

It is preferred herein that the x-, y- and z-directions be defined, in part, with respect to the reference surface. It is, however, most important to the practice of the present invention that the x-, y- and z-directions be oriented with respect to the laser beam axis and that the adjusting directions of the fiber holder and positioner 160 be parallel to those directions. The reference surface merely provides a convenient frame of reference for fixing the x- and y-directions and for mounting components. The reference surface could, however, by any planar surface, aside from the surface on which the components of system 100 are mounted, which enables definition of the x-and y-directions. For example, mounting surface 144 could serve as the reference surface.

While a guide bar is described hereinabove for facilitating the positioning of mechanical positioning apparatus 102 of the present invention, the invention is not so limited. The desired orientation of the mechanical seat with respect to the fiber end is described hereinabove. The initial orientation of the apparatus can be accomplished without the aid of the guide bar. The groove in the ledge of mechanical seat 200 or the slots in the other mechanical seat constructions disclosed above may adequately serve to orient the positioning apparatus in the x- and z-directions. In any event, once positioning apparatus 102 is properly oriented, its base 120 is rigidly bolted down and not subject to further movement.

While the present invention as illustrated and described hereinabove is practiced to enable positioning of a second fiber after initial alignment of a first fiber at the same installation, the invention is not so limited. The invention may be used to transfer the alignment conditions from a first environment, e.g. a laboratory, to a second environment, e.g. a manufacturing facility. Briefly, this would be accomplished by determining in the first environment, such as an experimental arrangement, the focal length of the focusing lens using another laser beam (such as generated by a low power HeNe laser) that is preferably centered on the lens, with the lens being positioned above a base plate in a manner substantially the same as in the apparatus of the second environment in which the same lens is to actually be used. The orientation of the beam axis relative to the lens would be noted. An optical fiber can then be aligned for injection within the experimental arrangement using optical alignment techniques and with the fiber mounted in a fiber holder that is preferably of the same type as to be used in the second environment apparatus. The mechanical positioning apparatus of the present invention is then used to find the fiber end x, y and z positions with reference to the focusing lens front surface. Subsequently, the same focusing lens is placed in the second environment apparatus, assuring that the beam axis orientation relative to the lens is the same as in the first environment. The desired fiber end position is recreated in that apparatus with reference to the focusing lens front surface using the inventive mechanical positioning apparatus. The fiber is then positioned to appropriately abut the positioning apparatus mechanical seat.

While various different mechanical seat configurations have been illustrated and described hereinabove, the invention may be successfully practiced with yet other seat configurations as may now occur to those skilled in the art. For example, the mechanical seat can be configured with the seating surface residing at the base of a V-shaped groove, the 'V' preferably pointing downward along the y-direction. The portion of the seating surface allocated for fiber end abutment would reside near the vertex of the 'V' so that when the fiber end abuts that seating surface portion, it is supported by the sides of the 'V'.

While the present invention is described hereinabove for practice with power laser beams, the invention is not so limited. The invention may be practiced with equal effectiveness in non-materials processing applications, such as where the laser beam being injected is carrying communication signals. Also, while the positioner locating pins are provided with a tight fit in the mounting surface 144 holes and a slip fit with positioner 160, the practice of the present invention would be unaffected by providing the pins so that the tight and slip fits are respectively provided with the positioner and mounting surface.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for positioning an end of an optical fiber at a predetermined location for injection with a laser beam, said fiber end predetermined location being uniquely defined relative to a laser beam axis and a reference surface, the fiber being mounted in fiber holding means for adjustably moving said fiber end in x, y and z mutually orthogonal coordinate directions to achieve said predetermined location, both the beam axis and a longitudinal axis of a fiber end portion adjoining the fiber end being parallel to said z-direction, said apparatus comprising:

positioning means for adjustably positioning an object affixed thereto in three mutually orthogonal coordinate directions;

a mechanical seat affixed to said positioning means and including a planar seating surface for seating the fiber end, a predetermined position on said seating surface allocated for seating the fiber end when positioned at said predetermined location; and means for supporting said positioning means in a unique predetermined relation to said reference surface so that the three orthogonal adjusting directions thereof are parallel to said x-, y-, and z-directions and said planar seating surface is both perpendicular to said z-direction and positioned to confront the fiber end positioned at said predetermined location, said supporting means further supporting said positioning means so that said seating surface can be adjusted in said x-, y- and z-directions until reaching first x, y and z positions effective to position the fiber end to substantially abut said seating surface predetermined position, said positioning means enabling restoration of said first x, y and z positions following positioning means readjustment along at least one of said x-, y- or z-directions to introduce sufficient clearance between said mechanical seat and the fiber end to allow removal of said positioning means and said mechanical seat;

so that for an initial installation of a first optical fiber with its fiber end positioned at said fiber end predetermined location, said positioning means can be adjustably positioned to said first x, y and z positions with the first fiber end substantially abutting said seating surface predetermined position and then said positioning means can be removed following readjustment in at least one of said x-, y- or z-directions and further so that in order to subsequently determine if the first fiber end is still positioned at said predetermined location or to install a second fiber in place of the first fiber, said positioning means is first reinstalled and adjusted so that said seating surface is positioned at said first x, y and z positions and then the fiber to be positioned is moved until the end thereof substantially abuts said seating surface predetermined position.

2. The apparatus of claim 1 wherein said positioning means is only readjusted in said z-direction to introduce the sufficient clearance between said mechanical seat and the fiber end.

3. The apparatus of claim 2 wherein said first z position corresponds to a restorable reference position in a z-direction adjustment range of said positioning means.

4. The apparatus of claim 1 where said seating surface adjoins a first surface of said mechanical seat, a portion of said seating surface being bounded by a substantially planar ledge portion perpendicular to said seating surface and parallel to said z-direction while the remainder of said seating surface extends to a periphery of said mechanical seat, said ledge portion extending between said seating surface and said mechanical seat first surface, said ledge portion including a groove having a semicircular cross section and extending from a base at said seating surface to said mechanical seat first surface, said groove having an axis parallel to said z-direction and a diameter exceeding by a small predetermined amount the diameter of the optical fiber to be positioned, said seating surface predetermined position being at the base of said groove, so that an optical fiber laying in said groove abutting said seating surface abuts said seating surface predetermined position.

5. The apparatus of claim 1 wherein said seating surface resides at the base of a slot formed in a first surface of said mechanical seat, said slot having a uniform width selected to exceed by a small predetermined amount the diameter of the optical fiber to be positioned, said slot being defined by a slot wall perpendicular to said seating surface; and said seating surface predetermined position residing at one end of said slot.

6. The apparatus of claim 5 wherein said slot extends to a periphery of said mechanical seat first surface.

7. Apparatus for positioning an end of an optical fiber at a predetermined location for injection with a laser beam, the fiber end predetermined location being uniquely defined relative to a laser beam axis and a reference surface, said fiber being mounted in fiber holding means for adjustably moving said fiber end in x, y and z mutually orthogonal coordinate directions to achieve said predetermined location, both the beam axis and a longitudinal axis of a fiber end portion adjoining the fiber end being parallel to said z-direction, said apparatus comprising:

positioning means for adjustably positioning an object affixed thereto in three mutually orthogonal coordinate directions;

a mechanical seat affixed to said positioning means and including a planar seating surface for seating the fiber end, a predetermined position on said seating surface allocated for seating the fiber end when positioned at said predetermined location; and means for supporting said positioning means in a unique predetermined relation to said reference surface so that the three orthogonal adjusting directions thereof are parallel to said x-, y-, and z-directions and said planar seating surface is both perpendicular to said z-direction and positioned to confront the fiber end positioned at said predetermined location, said supporting means further supporting said positioning means so that said seating surface predetermined position is within positioning means x- and y-direction adjustment ranges of said fiber end predetermined location and the fiber end positioned at said predetermined location would substantially abut said seating surface while said positioning means is at a restorable reference position of a z-direction adjustment range;

so that for an initial installation of a first optical fiber with its fiber end positioned at said fiber end predetermined location, said positioning means can be adjustably positioned to first x and y positions while held at said z-direction reference position with the first fiber end substantially abutting said seating surface predetermined position and then said positioning means can be removed following adjustment in said z-direction to introduce a clearance between said mechanical seat and the first fiber end while maintaining said first x and y adjustment positions, and further so that in order to subsequently determine if the first fiber end is still positioned at said predetermined location or to install a second fiber in place of the first fiber, said positioning means is first positioned at said first x and y positions and restored to said z-direction reference position and then the fiber to be positioned is moved until the end thereof substantially abuts said seating surface predetermined position.

8. The apparatus of claim 7 wherein said z-direction reference position is at one end of the z-direction adjustment range.

9. The apparatus of claim 7 wherein said seating surface adjoins a first surface of said mechanical seat, a portion of said seating surface being bounded by a substantially planar ledge portion perpendicular to said seating surface and parallel to said z-direction while the remainder of said seating surface extends to a periphery of said mechanical seat, said ledge portion extending between said seating surface and said mechanical seat first surface, said ledge portion including a groove having a semicircular cross section and extending from a base at said seating surface to said mechanical seat first surface, said groove having an axis parallel to said z-direction and a diameter exceeding by a small predetermined amount the diameter of the optical fiber to be positioned, said seating surface predetermined position being at the base of said groove, so that an optical fiber laying in said groove abutting said seating surface abuts said seating surface predetermined position.

10. A method for positioning an end of an optical fiber at a predetermined location for injection with a laser beam, said fiber end predetermined location being uniquely defined relative to a beam axis and a reference surface, an end portion of the fiber proximate the fiber end being mounted in fiber holding means for adjustably moving said fiber end in x, y, and z mutually orthogonal coordinate directions to achieve said predetermined location, both the beam axis and a longitudinal axis of the fiber end portion being parallel to said z-direction, said method comprising the steps of:

(a) mounting a planar seating surface of a mechanical seat to confront the end of a first optical fiber where that fiber end is positioned at said predetermined location, said seating surface including a predetermined position allocated for seating the fiber end when positioned at said predetermined location, said seating surface being perpendicular to said z-direction;

(b) adjusting the position of said mechanical seat in said x-, y- and z-directions until reaching first x, y and z positions effective to position said first fiber end to substantially abut said seating surface predetermined position;

(c) readjusting the position of said mechanical seat in at least one of said x-, y- or z-directions by a distance sufficient to effect a clearance between said mechanical seat and the first fiber end to allow removal of said mechanical seat;

(d) removing said mechanical seat to enable injection of the laser beam into the first fiber end;

upon replacement of the first fiber with a second fiber, the second fiber being mounted in the fiber holding means, positioning the second fiber end at the fiber predetermined location by performing the steps of:

(e) remounting the mechanical seat to a position identical to that which it held in step(b) relative to said x-, y- and z-directions including adjustment to restore said first x, y and z positions;

(f) moving the second fiber in said x-, y- and z-directions until the end thereof substantially abuts said seating surface predetermined position;

(g) repeating step(c); and (h) removing said mechanical seat to enable injection of the laser beam into the second fiber end.

11. The method of claim 10 wherein the readjustment in step(c) is only effected in said z-direction.

12. The method of claim 11 wherein said first z position corresponds to a restorable reference position in a z-direction range of adjustment.

13. The method of claim 10 wherein said seating surface adjoins a first surface of said mechanical seat, a portion of said seating surface being bounded by a substantially planar ledge portion perpendicular to said seating surface and parallel to said z-direction while the remainder of said seating surface extends to a periphery of said mechanical seat, said ledge portion extending between said seating surface and said mechanical seat first surface, said ledge portion including a groove having a semicircular cross section and extending from a base at said seating surface to said mechanical seat first surface, said groove having an axis parallel to said z-direction and a diameter exceeding by a small predetermined amount the diameter of the optical fiber to be positioned, said seating surface predetermined position being at the base of said groove, so that an optical fiber laying in said groove abutting said seating surface abuts said seating surface predetermined position.

14. The method of claim 10 wherein said seating surface resides at the base of a slot formed in a first surface of said mechanical seat, said slot having a uniform width selected to exceed by a small predetermined amount the diameter of the optical fiber to be positioned, said slot being defined by a slot wall perpendicular to said seating surface; and said seating surface predetermined position residing at one end of said slot.

15. The method of claim 14 wherein said slot extends to a periphery of said mechanical seat first surface.

16. A method for positioning an end of an optical fiber at a predetermined location for injection with a laser beam, said fiber end predetermined location being uniquely defined relative to a laser beam axis and a reference surface, an end portion of the fiber proximate the fiber end being mounted in fiber holding means for adjustably moving said fiber end in x, y, and z mutually orthogonal coordinate directions to achieve said predetermined location, both the beam axis and a longitudinal axis of the fiber end portion being parallel to said z-direction, said method comprising the steps of:

(a) mounting a planar seating surface of a mechanical seat to confront the end of a first optical fiber where that fiber end is positioned at said predetermined location, said seating surface including a predetermined position allocated for seating the fiber end when positioned at said predetermined location, said seating surface being perpendicular to said z-direction;

(b) positioning said mechanical seat so that said first fiber end abuts said seating surface, said mechanical seat being adjustably positionable in said x-, y- and z-directions and adjusted so that it is positioned at a z-direction adjustment range reference position;

(c) adjusting the position of said mechanical seat in said x- and y-directions so that said first fiber end substantially abuts said seating surface predetermined position;

(d) fixing the x- and y-direction adjustments of said mechanical seat against further adjusting movement;

(e) adjusting the position of said mechanical seat in the z-direction away from said z-direction reference position by a distance sufficient to effect a clearance between said mechanical seat and the first fiber end to allow removal of said mechanical seat;

(f) removing said mechanical seat to enable injection of the laser beam into the first fiber end;

upon replacement of the first fiber with a second fiber, the second fiber being mounted in the fiber holding means, positioning the second fiber end at the fiber predetermined location by performing the steps of:

(g) remounting identical to that which it held in step(d) relative to said x-, y- and z-directions including readjustment to said z-direction reference position;

(h) moving the second fiber in said x-, y- and z-directions until the end thereof substantially abuts said seating surface predetermined position;

(i) repeating step(e); and (j) removing said mechanical seat to enable injection of the laser beam into the second fiber end.

17. The method of claim 16 wherein said z-direction reference position corresponds to one end of the z-direction adjustment range.

18. The method of claim 16 wherein said seating surface adjoins a first surface of said mechanical seat, a portion of said seating surface being bounded by a substantially planar ledge portion perpendicular to said seating surface and parallel to said z-direction while the remainder of said seating surface extends to a periphery of said mechanical seat, said ledge portion extending between said seating surface and said mechanical seat first surface, said ledge portion including a groove having a semicircular cross section and extending from a base at said seating surface to said mechanical seat first surface, said groove having an axis parallel to said z-direction and a diameter exceeding by a small predetermined amount the diameter of the optical fiber to be positioned, said seating surface predetermined position being at the base of said groove, so that an optical fiber laying in said groove abutting said seating surface abuts said seating surface predetermined position.

* * * * *